(12) United States Patent
Furukawa et al.

(10) Patent No.: US 8,228,037 B2
(45) Date of Patent: Jul. 24, 2012

(54) BATTERY SYSTEM WITH RELAYS

(75) Inventors: Kimihiko Furukawa, Kakogawa (JP); Junya Yano, Kasai (JP); Kuniho Tanaka, Kasai (JP)

(73) Assignee: Sanyo Electric Co., Ltd., Osaka (JP)

( * ) Notice: Subject to any disclaimer, the term of this patent is extended or adjusted under 35 U.S.C. 154(b) by 492 days.

(21) Appl. No.: 12/623,796

(22) Filed: Nov. 23, 2009

(65) Prior Publication Data
US 2010/0127663 A1    May 27, 2010

(30) Foreign Application Priority Data

Nov. 26, 2008 (JP) .................................. 2008-301743

(51) Int. Cl.
*H02J 7/00* (2006.01)
(52) U.S. Cl. ....................................................... 320/134
(58) Field of Classification Search .................... 320/134
See application file for complete search history.

(56) References Cited

U.S. PATENT DOCUMENTS

| | | | | |
|---|---|---|---|---|
| 6,008,627 A | * | 12/1999 | Narita | 320/134 |
| 6,992,463 B2 | * | 1/2006 | Yoshio | 320/134 |
| 7,595,609 B2 | * | 9/2009 | Wang et al. | 320/134 |
| 7,602,146 B2 | * | 10/2009 | Carrier et al. | 320/120 |

FOREIGN PATENT DOCUMENTS

| | | |
|---|---|---|
| JP | 2002-95157 | 3/2002 |
| JP | 2008-193776 | 8/2008 |

* cited by examiner

*Primary Examiner* — Ramy Ramadan
(74) *Attorney, Agent, or Firm* — Wenderoth, Lind & Ponack, LLP

(57) ABSTRACT

The battery system is provided with a battery 1 that can be recharged, a fuse 8 connected to the battery 1 that blows with excessive current flow, relays 2 connected to the output-side of the battery 1, and a current cut-off circuit 4 that detects excessive battery 1 current and controls the relays 2. The current cut-off circuit 4 detects excessive battery 1 current, and is provided with a timer section 24 that designates a time delay until the relays 2 are switched from ON to OFF. For the delay time of the timer section 24, the fusing current of the fuse 8 is set lower than the maximum cut-off current of the relays 2 and higher than the maximum allowable battery 1 charging and discharging current. In a situation where excessive current greater than the maximum cut-off current of the relays 2 flows through the battery 1, the fuse 8 is blown during the timer 24 delay time, and the current cut-off circuit 4 switches the relays 2 from ON to OFF when the delay time has elapsed.

13 Claims, 3 Drawing Sheets

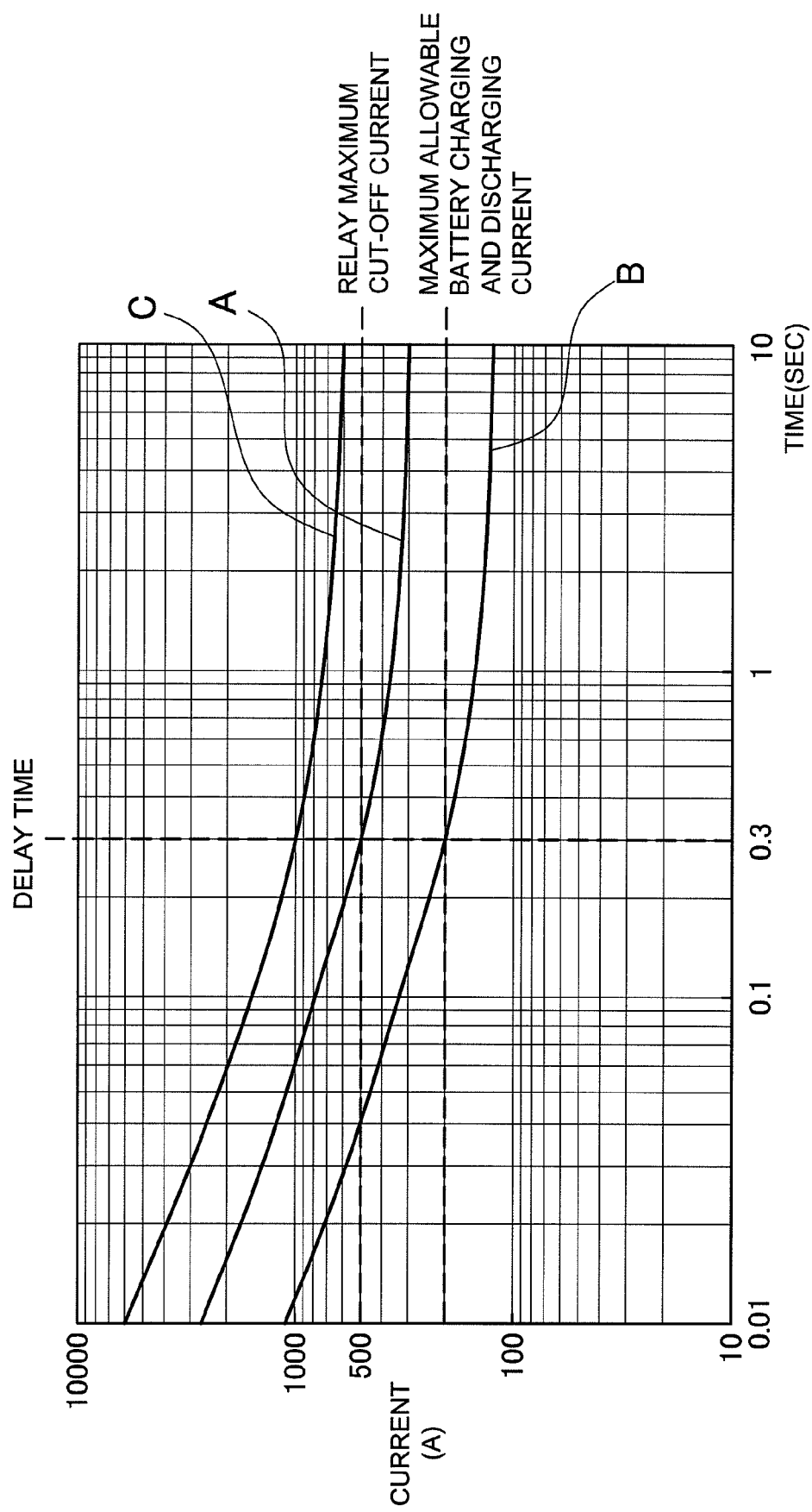

BATTERY SYSTEM WITH RELAYS

BACKGROUND OF THE INVENTION

1. Field of the Invention

The present invention relates to a battery system optimized for a car power source apparatus that supplies electric power to a motor that drives the vehicle, and in particular to a battery system that detects excessive current and cuts-off current flow with a fuse and relays.

2. Description of the Related Art

A battery system has been developed with a series connected fuse and relays to prevent excessive battery current. (Refer to Japanese Patent Application Disclosure 2008-193776.) As shown in FIG. 1, the battery system of Japanese Patent Application 2008-193776 has a battery 91 divided into two battery blocks 95, and those battery blocks 95 are connected in series via a fuse 98. In addition, the battery system has relays 92 connected to the output-side of the battery 91. In this battery system, if excessive current flows in the driving battery, the fuse 98 blows and cuts-off battery 91 current. Furthermore, a control circuit 94, which controls the relays 92 ON and OFF, switches the relays 92 OFF to cut-off battery 91 current. The battery system control circuit 94 is provided with a current detection circuit 99 to detect battery 91 current, and battery 91 charging and discharging is controlled based on the detected current. The current detection circuit 99 detects current within the normal battery 91 charging and discharging range, for example, at or below 200 A for a car battery system. If a current greater than this flows in the battery, namely if abnormal high current flows in the battery, the relays are switched OFF to cut-off battery current. The battery system of FIG. 1 achieves a high degree of safety by blowing the fuse 98 or switching the relays 92 OFF in an excessive current condition.

However, it is possible for the battery system shown in FIG. 1 to be unable to blow the fuse 98 and switch the relays 92 OFF in an excessive battery 91 current situation. This is because when excessive current is detected and the relays are controlled OFF, it is possible for relay contacts to fuse together due to the high current and prevent the relays from being switched OFF. If an attempt is made to cut-off current exceeding the maximum cut-off current of the relays, relay contacts can fuse together by arcing during the cut-off attempt. Therefore, the battery system shown in FIG. 1 has the drawback that when the control circuit 94 detects excessive battery 91 current and controls the relays 92 OFF, relay 92 contacts can fuse together preventing cut-off if the current is greater than the maximum cut-off current of the relays 92.

The first object of the present invention is to avoid the drawback described above. Thus, it is an important object of the present invention to provide a battery system that can reliably cut-off battery current without fusing relay contacts.

Further, internal current cut-off sections can be provided such as current interrupt devices (CIDs) that cut-off current when battery charging conditions become abnormal. These internal current cut-off sections cut-off current under abnormal battery charging conditions to ensure battery safety. For example, a CID internal current cut-off section insures battery safety by cutting-off current when internal battery pressure becomes abnormally high. Since the CID activates to cut-off current when the battery has been over-charged and internal pressure has increased to an abnormal level, a condition where the CID has cut-off current is a condition that retains the battery in its over-charged state. Consequently, while CIDs are safety assuring devices, it is important to limit their operation as much as possible. Incidentally, since a CID is designed to cut-off current, its ability to withstand high currents is low relative to other battery structural elements. Therefore, it is possible for a CID to cut-off current as a result of excessive current alone.

The second object of the present invention is to address this drawback. Specifically, the second object of the present invention is to provide a battery system that does not activate the battery CID, but rather can reliably cut-off excessive battery current with the fuse and relays.

SUMMARY OF THE INVENTION

The first battery system of the present invention is provided with a battery 1 that can be recharged, a fuse 8 connected in series with the battery 1 that is self-fusing with excessive current flow, relays 2 connected in series with the output-side of the battery 1, and a current cut-off circuit 4 that detects excessive battery 1 current and controls the relays 2 from ON to OFF. The current cut-off circuit 4 detects excessive battery 1 current, and is provided with a timer section 24 that designates a delay time between excessive battery 1 current detection and ON to OFF switching of the relays 2. For the delay time of the timer section 24, the fusing current of the fuse 8 is set lower than the maximum cut-off current of the relays 2 and higher than the maximum allowable battery 1 charging and discharging current. In a situation where excessive current greater than the maximum cut-off current of the relays 2 flows through the battery 1 of this battery system, the fuse 8 is blown during the timer 24 delay time, and the current cut-off circuit 4 switches the relays 2 from ON to OFF when the delay time has elapsed.

The battery system described above has the characteristic that the relays can reliably cut-off excessive battery current without fusing relay contacts together, and excessive battery current can also be reliably cut-off by the fuse. This is because the battery system described above establishes a delay time between excessive battery current detection and ON to OFF switching of the relays. Further, for this delay time, the fusing current of the fuse is set below the maximum relay cut-off current and above the maximum allowable battery charging and discharging current. When excessive current greater than the maximum cut-off current of the relays flows through the battery of this battery system, the fuse is blown to cut-off current during the delay time, and the relays are switched OFF for cut-off when the delay time has elapsed. Therefore, excessive battery current can be reliably and safely cut-off by both the fuse and the relays without fusing relay contacts together. Conversely, if excessive current flow continues longer than the delay time, the current is lower than the current required to blow the fuse, and must be lower than the maximum cut-off current of the relays. Consequently, it is possible for the relays to cut-off current without fusing contacts together.

The above and further objects of the present invention as well as the features thereof will become more apparent from the following detailed description to be made in conjunction with the accompanying drawings.

BRIEF DESCRIPTION OF THE DRAWINGS

FIG. 3 is a graph showing current cut-off characteristics of the fuse, relays, and internal current cut-off section of an embodiment of the battery system of the present invention.

DETAILED DESCRIPTION OF THE EMBODIMENT(S)

Figure 1:
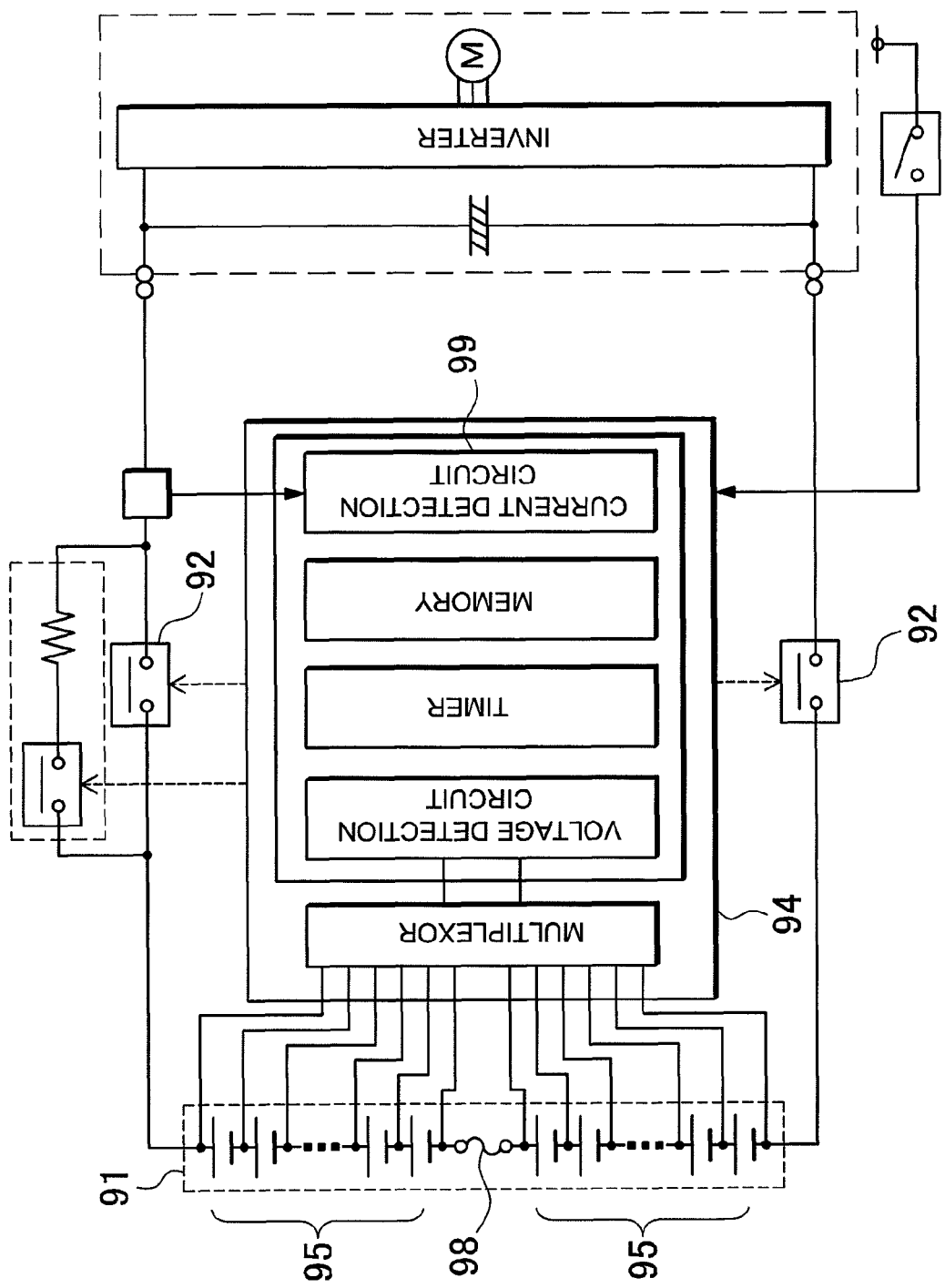
FIG. 1 is an abbreviated block diagram of a power source apparatus previously disclosed by the present applicant.

Another battery system is provided with a battery 1 having a plurality of battery cells 5 that can be recharged, a fuse 8 connected in series with the battery 1 that is self-fusing with excessive current flow, and internal current cut-off sections established in the battery cells 5 that cut-off battery cell 5 internal circuit connections under excessive current or over-charging conditions. The fusing characteristics of the fuse 8 are set to blow the fuse 8 at a current that is lower than the cut-off current of the internal current cut-off sections. In this battery system, when excessive current flows in the battery 1, the fuse 8 blows before internal current cut-off section activation.

Still another battery system is provided with a battery 1 having a plurality of battery cells 5 that can be recharged, relays 2 connected in series with the output-side of the battery 1, a current cut-off circuit 4 that detects excessive battery 1 current and controls the relays 2 from ON to OFF, and internal current cut-off sections housed in the battery cells 5 that cut-off battery cell 5 internal circuit connections under excessive current or over-charging conditions. The current cut-off circuit 4 detects excessive battery 1 current, and is provided with a timer section 24 that designates a delay time between excessive battery 1 current detection and ON to OFF switching of the relays 2. For the delay time of the timer section 24, the cut-off current of the internal current cut-off sections is set higher than the maximum cut-off current of the relays 2. In this battery system, when excessive current flows in the battery 1 and the internal current cut-off sections do not cut-off current, the relays 2 are switched from ON to OFF to cut-off battery 1 current.

The battery systems described above are characterized in that excessive current can be reliably cut-off by the fuse or the relays without activating internal current cut-off sections housed in the battery cells. This is because the fuse or relays of these battery systems cut-off battery current before current cut-off by the battery internal current cut-off sections.

Battery cell 5 internal current cut-off sections for the battery system of the present invention can be current interrupt devices (CIDs).

Further, the output voltage of the battery 1 for the battery system of the present invention can be greater than or equal to 10V and less than or equal to 500V.

Figure 2:
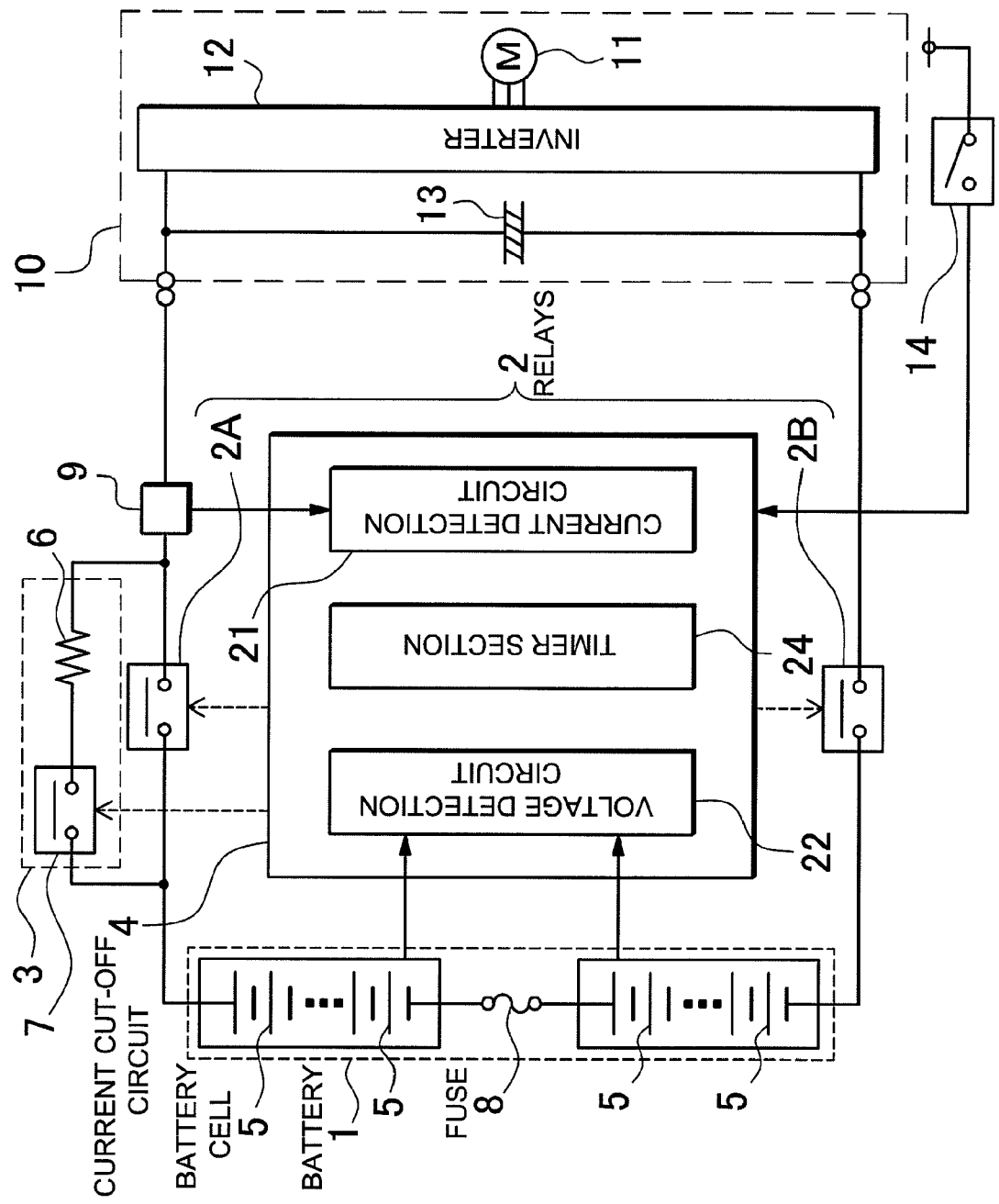
FIG. 2 is an abbreviated block diagram of a battery system for an embodiment of the present invention.

The following describes an embodiment of the present invention. The battery system shown in FIG. 2 is installed on board a vehicle such as a hybrid car, electric automobile, or fuel cell vehicle, and powers a connected motor 11 as its load 10 to drive the vehicle. The motor 11, which is the battery 1 load 10, is connected to the battery 1 through an inverter 12. The inverter 12 converts battery 1 direct current (DC) to three-phase alternating current (AC), and controls power supplied to the motor 11.

The battery system of FIG. 2 is provided with a battery 1, a fuse 8 connected in series with the battery 1, relays 2 connected to the output-side of the battery 1 to switch power supplied to the load 10 ON and OFF, a pre-charge circuit 3 that pre-charges a load 10 capacitor 13 before switching the relays 2 ON, and a current cut-off circuit 4 that controls the pre-charge circuit 3 and the relays 2 ON and OFF.

The battery 1 powers the motor 11 that drives the vehicle through the inverter 12. To supply high power to the motor 11, the battery has many battery cells 5 connected in series to increase the output voltage. Lithium ion batteries or nickel hydride batteries are used as the battery cells 5. A battery system with lithium ion battery cells has a plurality of lithium ion batteries connected in series. A battery system with nickel hydride battery cells has a plurality of nickel hydride batteries connected in series as a battery module, and then has a plurality of battery modules connected in series to increase output voltage. Batteries of the battery system are not limited to lithium ion batteries or nickel hydride batteries. Any batteries that can be recharged such as nickel cadmium batteries can be used.

To enable high power to be supplied to the motor 11, the battery 1 output voltage is made high. For example, battery 1 output voltage can be 200V to 400V. However, a DC-DC converter (not illustrated) can also be connected to the output-side of the battery to raise the battery voltage and supply power to the load. In this type of battery system, the number of batteries connected in series can be reduced and the battery output voltage can be lowered. In this case, battery 1 output voltage can be, for example, 150V to 400V.

The current cut-off circuit 4 is provided with a voltage detection circuit 22 to detect the voltages of the battery cells 5 that make up the battery 1 and control battery 1 charging and discharging, and a current detection circuit 21 to detect battery 1 current.

The voltage detection circuit 22 detects the voltages of a plurality of battery cells 5, or it detects the voltages of battery modules that have a plurality of battery cells connected in series. The voltage detection circuit of a battery system with lithium ion batteries detects the voltage of each lithium ion battery. The voltage detection circuit of a battery system with nickel hydride batteries detects the voltages of battery modules that have a plurality of nickel hydride batteries connected in series.

The current detection circuit 21 detects the current flow in the battery 1 via a current sensor 9 to determine the remaining capacity of the battery cells 5. The current detection circuit 21 is provided because the battery system controls currents for charging and discharging the battery 1 by determining the remaining capacity of the battery 1. The current cut-off circuit 4 computes remaining capacity by integrating the battery 1 current measured by the current detection circuit 21. The battery system sends signals to the vehicle-side and controls charging and discharging currents to maintain the remaining capacity of the battery 1 near 50%. This is to reduce battery 1 degradation as much as possible under various driving conditions. Since remaining capacity of the battery 1 increases with the integral of the charging current and decreases with the integral of the discharging current, remaining capacity can be computed from the integrals of the charging and discharging currents.

The current cut-off circuit 4 detects excessive current and switches the relays 2 from ON to OFF to cut-off the battery 1 current. Although the current detection circuit 21 of the current cut-off circuit 4 detects battery 1 current, it only detects current within the range of battery 1 charging and discharging. Consequently, when excessive current flows in the battery 1, the amount of excessive current cannot be determined. Specifically, the current detection circuit 21 can detect whether or not excessive current flow has occurred, but it cannot detect the amount of the excessive current. Therefore, the current cut-off circuit 4 switches the relays 2 from ON to OFF to cut-off battery 1 current when excessive current is detected regardless of the amount of the excessive current. However, the current cut-off circuit 4 does not immediately switch the relays 2 OFF when excessive is detected.

The current cut-off circuit 4 is provided with a timer section 24 that stores a delay time in memory for the delay from excessive current detection until the relays 2 are switched OFF. After the detection of excessive current, the current cut-off circuit 4 switches the relays 2 from ON to OFF when the delay time stored in the timer section 24 has elapsed. In FIG. 3, the delay time for the current cut-off circuit 4 to switch the relays 2 OFF is set to 0.3 sec. This current cut-off circuit 4 detects excessive current and then switches the relays 2 OFF to cut-off battery 1 current after the 0.3 sec delay time has elapsed. Specifically, battery 1 current is not cut-off for a period of 0.3 sec after excessive current detection.

Relay contacts are switched ON and OFF by the current cut-off circuit 4. Although not illustrated, a relay is provided with a magnetic activation coil to switch the contacts ON and OFF. The current cut-off circuit 4 controls the current through the relay activation coils to switch the contacts ON and OFF. Contacts of a standard relay are switched ON when current flows through the activation coil and switched OFF when activation coil current is cut-off.

In general, the maximum current that allows a relay to be cut-off is specified. This maximum cut-off current can be increased by increasing the current carrying capacity of the contacts and the contacting pressure between movable contacts and stationary contacts. However, for a relay with a high maximum cut-off current, movable contacts and stationary contacts must be large. Further, a strong spring is required to quickly pull the large movable contacts apart from the stationary contacts, and a long movable contact ON-OFF stroke is required to rapidly separate the contacts. For a relay with a strong spring, the activation coil must be large and its current must be high. Specifically, a large activation coil requires high power consumption. As long as relay contacts are maintained in the ON state, activation coil power is consumed. A high power relay has the drawbacks that a large amount of power is consumed to hold the contacts in the ON state, and activation coil heat generation is large. Consequently, relay maximum cut-off current is set to an optimum value depending on the application considering the required maximum cut-off current, power consumption, and the amount of heat generated.

For example, since small size and light weight are critical for a car battery system, relay maximum cut-off current cannot be made indiscriminately large. Incidentally, when battery system output voltage is increased to increase power supplied to the load, short circuit current, which flows if the load is short circuited, becomes extremely large. Further, the short circuit energy increases proportional to the square of the current. Consequently, when the battery system controls the relays OFF under short circuit load conditions and high short circuit current, it is possible for the movable contacts to fuse together with the stationary contacts to prevent the relays from being switched OFF.

To prevent fusing of the relay 2 contacts, to reliably cut-off excessive battery 1 current, and to avoid cutting-off battery 1 current in a range that is lower than the excessive current, the fuse 8 has unique characteristics.

As shown by curve A of FIG. 3, the time to blow the fuse 8 and cut-off the current decreases as the current increases. Since the fuse 8 blows by self-heating, it is difficult to control the fusing current. An easily blown fuse can fuse open at a current within the range of allowable battery charging and discharging current. In contrast, for a fuse that is difficult to blow, fusing together of the relay contacts cannot be reliably prevented. By setting the fuse 8 and relay 2 characteristics in a favorable relation, the battery system of the present invention reliably prevents relay contacts from fusing together, and reliably cuts-off excessive battery 1 current or over-charging current with the fuse 8 and relays 2. To achieve this, the fusing current of the fuse 8 is set to blow the fuse 8 during the delay time of the current cut-off circuit 4 timer section 24 at a current that is lower than the maximum cut-off current of the relays 2.

In FIG. 3, since the maximum cut-off current of the relays 2 is 500 A and the delay time is 0.3 sec, the fusing current of the fuse 8 after 0.3 sec is set less than 500 A. During the delay time from 0 to 0.3 sec when the timer section 24 is counting, the fuse 8 blows to cut-off current at a current that is large enough to fuse the relay 2 contacts, that is at a current greater than the maximum cut-off current of the relays 2. Consequently, excessive current that does not blow the fuse 8 during the 0.3 sec delay time is a current that will not fuse the relay 2 contacts, and the relays 2 can be switched OFF after the 0.3 sec delay time without fusing the contacts together. Since the relays 2 cut-off battery 1 current after the 0.3 sec delay time has elapsed regardless of whether the fuse 8 has blown or not, fusing characteristics after the 0.3 sec delay time are not essential. Fuse 8 characteristics are required from the instant excessive current flows until the delay time has elapsed; namely, fusing characteristics from 0 to 0.3 sec are needed. In particular, only the characteristic fusing current at 0.3 sec after initiation of excessive current flow is essential. However, it is undesirable to blow the fuse 8 at a current within the range of allowable battery 1 charging and discharging current. Therefore, the fuse 8 is set to blow within the 0.3 sec delay time at a current greater than 200 A, which is the maximum allowable battery 1 charging and discharging current. Consequently, the fuse 8 is designed to blow at a current between curve A in FIG. 3 and the maximum allowable battery charging and discharging current. A fuse 8 with the fusing characteristics of curve B in FIG. 3 can blow after the 0.3 sec delay time has elapsed at a current that is less than 200 A, which is the maximum current for battery 1 charging and discharging. This makes it impossible to charge and discharge the battery 1 within the range of allowable charging and discharging current. A fuse with these characteristics cannot be employed because the battery system becomes unusable at normal currents.

In addition, internal circuit connections in the battery cells 5 that make up the battery 1 can cut-off current under abnormal conditions such as excessive current or over-charging. Specifically, battery cells 5 are provided with internal current cut-off sections that independently cut-off current. As internal current cut-off sections, there are current interrupt devices (CIDs) that activate to cut-off current when internal battery pressure rises abnormally. Although a CID activates to cut-off current under over-charging conditions when battery cell 5 internal pressure rises abnormally, because of its current cut-off structure, the CID has a lower tolerance for high currents than other battery cell structural elements. Therefore, when excessive current is generated, of all the structural elements within a battery cell, the CID is most easily fused open.

Curve C of FIG. 3 shows cut-off characteristics for internal current cut-off section activation to cut-off current. Fusing characteristics of the fuse 8 (curve A and curve B) are set to cut-off current at a lower value than the cut-off characteristics of the internal current cut-off sections. Therefore, current cut-off by an internal current cut-off section can be avoided by blowing the fuse 8 before the 0.3 sec delay time elapses.

As shown by curve C of FIG. 3, internal current cut-off section cut-off characteristics are set to currents greater than the 500 A maximum cut-off current of the relays 2 for times after the 0.3 sec timer section 24 delay time has elapsed. In this battery system, when excessive current flows through the battery 1, the relays 2 are switched from ON to OFF to cut-off battery 1 current at a high current that is lower than the cut-off current of the internal current cut-off sections. Consequently, battery 1 current is cut-off before the internal current cut-off sections cut-off current. Therefore, excessive current can be cut-off while avoiding internal current cut-off section activation.

The load 10 connected to the battery 1 is an inverter 12 with a motor 11 connected to the output-side of the inverter 12. A capacitor 13 with large capacitance is connected in parallel with the inverter 12, which is the load 10. With the relays 2 in the ON state, electric power is supplied to the load 10 inverter 12 from both the capacitor 13 and the battery 1. In particular, instantaneous high power is supplied to the load 10 inverter 12 from the capacitor 13. For this reason, instantaneous power supplied to the load 10 can be increased by connecting a capacitor 13 in parallel with the battery 1. Since the power that can be supplied from the capacitor 13 to the load 10 inverter 12 is proportional to the capacitance, a capacitor 13 with extremely high capacitance, for example, 4000 µF to 6000 µF is used. When a high capacitance capacitor 13 in the discharged state is connected to a battery 1 with high output voltage, extremely high transient charging current will flow. This is because capacitor 13 impedance is very low.

When an ON signal is input from the ignition switch 14, a pre-charge circuit 3 pre-charges the load 10 capacitor 13 before the relays 2 are switched ON. The pre-charge circuit 3 pre-charges the capacitor 13 while limiting capacitor 13 charging current. The pre-charge circuit 3 has a pre-charge switch 7 connected in series with a pre-charge resistor 6. The pre-charge resistor 6 limits pre-charge current to the load 10 capacitor 13. Pre-charge circuit 3 pre-charge current can be reduced by increasing the electrical resistance of the pre-charge resistor 6. For example, the pre-charge resistor can be a 10Ω, 30 W resistor. For a 400V output voltage battery 1, this pre-charge resistor 6 limits peak capacitor 13 charging current to 40 A.

The pre-charge circuit 3 is connected in parallel with the contacts of a relay 2. In the battery system of the figures, relays 2 are provided on both the positive and negative sides, and the pre-charge circuit 3 is connected in parallel with the contacts of the relay 2 on the positive-side. In this battery system, the capacitor 13 is pre-charged via the pre-charge circuit 3 with the negative-side relay 2B ON and the positive-side relay 2A OFF. After the capacitor 13 is pre-charged by the pre-charge circuit 3, the positive-side relay 2A is switched from OFF to ON, and the pre-charge switch 7 in the pre-charge circuit 3 is switched OFF.

In the pre-charge circuit 3, the pre-charge switch 7 is turned ON to pre-charge the capacitor 13. The pre-charge switch 7 is a switch with mechanical contacts such as a relay. However, a semiconductor switching device such as a bipolar transistor or field effect transistor (FET) can also be used as the pre-charge switch. For a semiconductor switching device pre-charge switch, there is no contact degradation over time and the lifetime of the switch can be increased. Further, since a semiconductor switching device can be rapidly switched ON and OFF in an extremely short period, the capacitor can be pre-charged while switching the pre-charge switch ON and OFF.

After the capacitor 13 is pre-charged by the pre-charge circuit 3, the positive-side relay 2A connected in parallel with the pre-charge circuit 3 is switched ON to put the battery system in a state that supplies power from the battery 1 to the load 10, that is a state where the motor 11 is powered by the battery 1 to drive the vehicle.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2008-301743 filed in Japan on Nov. 26, 2008, the content of which is incorporated herein by reference.

What is claimed is:

1. A battery system comprising:
    a battery provided with a plurality of rechargeable battery cells;
    a fuse connected in series with the battery that is self-fusing with excessive current flow;
    relays connected in series with the output-side of the battery; and
    a current cut-off circuit that detects excessive battery current and controls the relays from ON to OFF,
    wherein the current cut-off circuit detects excessive battery current, and is provided with a timer section that designates a delay time from the time excessive current is detected until the relays are switched from ON to OFF,
    wherein for the delay time of the timer section, the fusing current of the fuse is set lower than the maximum cut-off current of the relays and higher than the maximum allowable battery charging and discharging current, and
    in a situation where excessive current greater than the maximum cut-off current of the relays flows through the battery, the fuse is blown during the timer section delay time, and the current cut-off circuit switches the relays from ON to OFF when the delay time has elapsed.

2. The battery system as cited in claim 1 wherein each battery cell is provided with an internal current cut-off section that cuts-off battery cell internal circuit connections for excessive current or over-charging; and the fusing characteristics of the fuse have the property that the fuse blows at a current that is lower than the characteristic cut-off current of the internal current cut-off section.

3. The battery system as cited in claim 2 wherein the battery cell internal current cut-off section is a current interrupt device.

4. The battery system as cited in claim 3 wherein the internal current cut-off section is a CID that activates to cut-off current when internal battery pressure rises abnormally.

5. The battery system as cited in claim 1 wherein a current cut-off circuit that detects excessive battery current and controls the relays from ON to OFF is provided, in each battery cell an internal current cut-off section that cuts-off battery cell internal circuit connections for excessive current or over-charging is provided; the current cut-off circuit detects excessive battery current, and is provided with a timer section that designates a delay time from the time excessive current is detected until the relays are switched from ON to OFF; for the delay time of the timer section, the cut-off current of the internal current cut-off section is set greater than the relay maximum cut-off current; and in a situation where excessive current flows in the battery and the internal current cut-off section does not cut-off the current, the relays are switched from ON to OFF to cut-off battery current.

6. The battery system as cited in claim 5 wherein the battery cell internal current cut-off section is a current interrupt device.

7. The battery system as cited in claim 6 wherein the internal current cut-off section is a CID that activates to cut-off current when internal battery pressure rises abnormally.

8. The battery system as cited in claim 6 wherein each battery cell is provided with an internal current cut-off section that cuts-off battery cell internal circuit connections for excessive current or over-charging; and the fusing characteristics of the fuse have the property that the fuse blows at a current that is lower than the characteristic cut-off current of the internal current cut-off section.

9. The battery system as cited in claim 8 wherein the battery cell internal current cut-off section is a current interrupt device.

10. The battery system as cited in claim 9 wherein the internal current cut-off section is a CID that activates to cut-off current when internal battery pressure rises abnormally.

11. The battery system as cited in claim 1 wherein battery output voltage is greater than or equal to 10V and less than or equal to 500V.

12. The battery system as cited in claim 1 that is installed on-board an automobile to power a motor that drives the vehicle.

13. The battery system as cited in claim 1 wherein the current cut-off circuit current detection circuit is a circuit that detects whether or not excessive current flows, but does not detect the magnitude of the excessive current.

* * * * *